United States Patent [19]

Nishimura

[11] Patent Number: 4,532,641
[45] Date of Patent: Jul. 30, 1985

[54] CASH ACCOUNTING SYSTEM

[75] Inventor: Katsuji Nishimura, Habikino, Japan

[73] Assignee: Sharp Kabushiki Kaisha, Osaka, Japan

[21] Appl. No.: 397,020

[22] Filed: Jul. 12, 1982

[30] Foreign Application Priority Data

| Jul. 20, 1981 | [JP] | Japan | 56-114549 |
| Jul. 21, 1981 | [JP] | Japan | 56-114909 |
| Jul. 24, 1981 | [JP] | Japan | 56-116999 |
| Sep. 2, 1981 | [JP] | Japan | 56-138741 |

[51] Int. Cl.³ .................... G06C 27/02; G06C 29/00
[52] U.S. Cl. .......................................... 377/14; 377/7; 377/8; 364/405
[58] Field of Search .................. 377/6, 7, 8, 13, 14; 364/405

[56] References Cited

U.S. PATENT DOCUMENTS

| 3,784,790 | 1/1974 | Hatanaka et al. | 377/8 |
| 4,070,564 | 1/1978 | Tucker | 364/405 |
| 4,216,461 | 8/1980 | Werth et al. | 377/13 |
| 4,310,885 | 1/1982 | Azcua et al. | 364/405 |
| 4,369,442 | 1/1983 | Werth et al. | 377/7 |
| 4,376,479 | 3/1983 | Sugimoto et al. | 377/14 |

Primary Examiner—John S. Heyman
Attorney, Agent, or Firm—Birch, Stewart, Kolasch & Birch

[57] ABSTRACT

A cash accounting system comprises a cash register for recording various transactions of money and having a central processing unit, a counting machine electrically connected with the cash register and operable to count money including bills used during each of the transactions, and a count data read-in device for writing count information providing by the counting machine as a result of the counting operation, in the central processing unit.

9 Claims, 8 Drawing Figures

CASH ACCOUNTING SYSTEM

BACKGROUND OF THE INVENTION

This invention relates to a cash accounting system of a type wherein a cash register is electrically connected with a cash counting machine for counting the amount of money, including coins and papers, which has been transacted.

A cash register currently used in banks for registering the sales done utilizes a construction as shown in FIG. 1 of the accompanying drawings. Referring to FIG. 1, reference numeral 1 is a function keyboard having a plurality of function keys including a deposit key and item specifying keys; reference numeral 2 is a key discriminator for discriminating which one of the function keys has been operated; reference numeral 3 is a central processing unit; reference numeral 4 is a numerical keyboard having a plurality of decimal digit keys; reference numeral 5 is a key encoder; reference numeral 6 is a denomination keyboard 6 having one or more denomination specifying keys; reference numeral 7 is an address counter; reference numeral 8 is a memory unit for storing various data; reference numeral 9 is an input/out control unit for controlling the memory unit 8; reference numeral 10 is a printer; reference numeral 11 is a display unit; and reference numeral 12 is a read-only memory for storing a micro-program necessary to control the sequence of operation of the system.

With the conventional cash register of the above described construction and as shown in FIG. 1, in the case where the deposit of, for example, 540 dollars in bills of small denomination, for example, five 100 dollar papers plus four 10 dollar papers, is desired to be registered on a particular ordinary account, the system is operated in a manner as shown in the flow chart of FIG. 2.

Referring to FIG. 2, prior to the cash register being actually utilized and at the initial two succeeding stages (1) and (2), an operator of the cash register manipulates the papers to count and then to record temporarily the amount counted for the purpose of confirmation. The recording of the amount counted is done according to the different denominations. After the total of the sub-amounts are recorded for each of the different denominations, i.e., the total of 500 dollars and 40 dollars, has been checked against the actual amount of money deposited, and at the stage (3), the operator manipulates the item specifying key to transmit from the function keyboard 1 to the central processing unit (hereinafter referred to as CPU) 3 through the key discriminator 2 a signal predicating that the subsequent information to enter the CPU is associated with the ordinary account. At the stage (4), by manipulating the numerical keyboard 4 and the denomination keyboard 6 alternately, the sub-amounts temporarily recorded are transmitted to the CPU. The key encoder 5 serves to convert the sub-amounts into respective binary coded decimal digit signals to enable the CPU to deal with the sub-amounts. Thereafter, at the stage (5) followed by the stage (4), the operator manipulates the deposit key to transmit from the function keyboard 1 to the CPU 3 through the key discriminator 2 a signal predicating that the previously entered money information is a deposit to be registered on the particular account. At the stage (6), the CPU 3 performs a checking to see if the total of the sub-amounts is equal to the amount of money deposited. If both are equal, the various data is, at the stage (7), stored at a predetermined area of the memory unit 8, designated by the address counter 7, under the control of the input/output control unit 9. On the other hand, if both are not equal, an error display is done at the stage (8) and the operator is then (at the stage (9)) assigned to make a reconfirmation by repeating the procedure from the initial stage (1).

The data memorized in the predetermined area of the memory unit 8 at the stage (7) is, at the stage (10), printed out on a journal paper and, at the same time, displayed through the display unit 11. After this has been done by the utilization of the cash register, the money handed to the operator is stored or deposited in a case at the stage (11). It is to be noted that the procedures shown in the chain-lined blocks in FIG. 2 represent those requiring the manual intervention.

From the foregoing, it is clear that, during the course of performance of the accounting job, the operator is required not only to manipulate the money to count prior to the cash register being actually utilized, but also to undergo, after the transaction has been completed by the utilization of the cash register, mental work to check to see if the cash register has been correctly manipulated and then to put the deposited money into the cash box. The above described conventional cash register has numerous disadvantages. For example, where the money to be deposited is large and/or includes various denominations, the operator tends to be bound to a lot of manual works for a prolonged period of time, resulting in reduction in efficiency and also in placing the customer in embarrassed position.

SUMMARY OF THE INVENTION

The present invention has, accordingly, for its essential object to provide an improved cash accounting system substantially free from the above discussed disadvantages and inconveniences inherent in the prior art cash register.

In order to accomplish this and other objects of the present invention, a cash accounting system of a type wherein a cash register for registering information concerning transaction of money is electrically connected with a cash counting machine for counting the amount of money including papers (bills) and coins used during the transaction is provided with a count write-in means for writing count information from the counting machine into a central processing unit of the cash register so that the count information can be transferred to the central processing unit at any desired time.

For the same purpose, the system of the type referred to above is provided with a money data memory unit so incorporated in the cash register that, in response to completion of the counting operation performed by the counting machine, the count information indicative of the amount deposited can be transferred to the money data memory unit.

Moreover, for the same purpose, the system of the type referred to above is provided with a means for handling the count information as an input indicative of information of different denominations, said handling means being incorporated in the cash register. The cash register so constructed is also provided with a means for detecting the presence or absence of the count information from the counting machine such that, in the case of the absence of the count information so detected by said detecting means, the entry of the information of different denominations is effected by means of an input means incorporated in the cash register. In addition, the memory unit used in the cash register for storing the count information fed from the counting machine is so designed that, in response to an instruction indicative of the completion of the recording of the money transaction, the contents stored in such memory unit can be erased.

Yet, for the same purpose, the system of the type referred to above may further comprise a particular keyboard input means operatively associated with the detecting means such that, in the event that the detecting means detects the presence or absence of the stored contents in the memory unit in response to the manipulation of the keyboard input means, either the stored contents in the memory unit can be read out from the memory unit or the counting machine can be instructed to start its counting operation.

BRIEF DESCRIPTION OF THE DRAWINGS

These and other objects and features of the present invention will become apparent from the following description taken in conjunction with preferred embodiments thereof with reference to the accompanying drawings, in which.

DETAILED DESCRIPTION OF THE INVENTION

Figure 1:
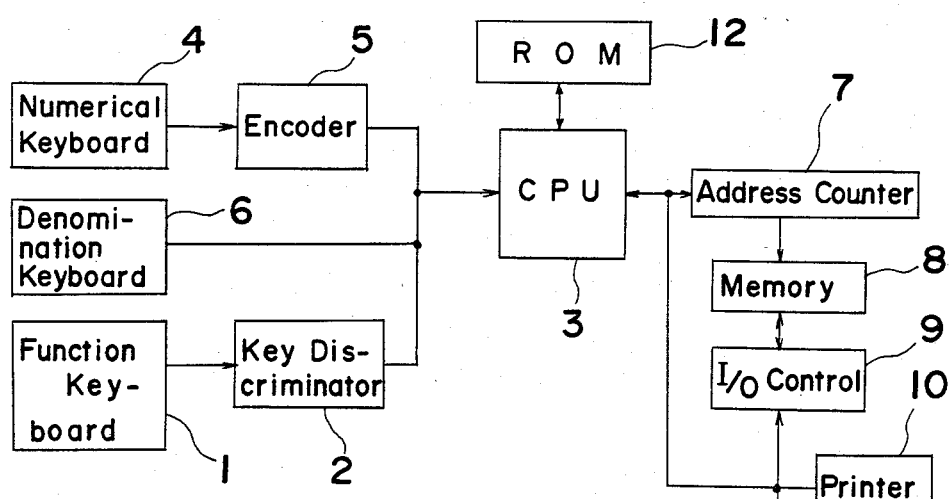
FIG. 1 is a schematic block diagram showing the prior art cash register.
Figure 2:
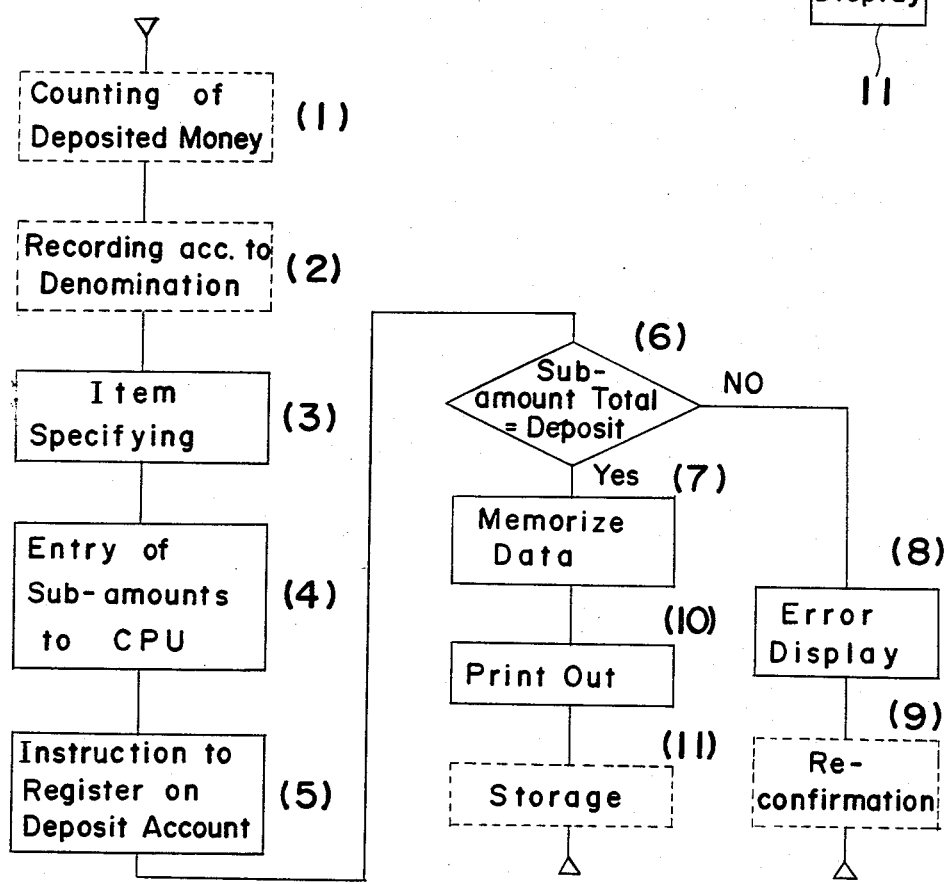
FIG. 2 is a flow chart showing the sequence of operation of the prior art accounting system utilizing the cash register shown in FIG. 1.

Before the description of the present invention proceeds, it is to be noted that like parts are designated by like reference numerals throughout FIGS. 3 to 6.

Figure 3:
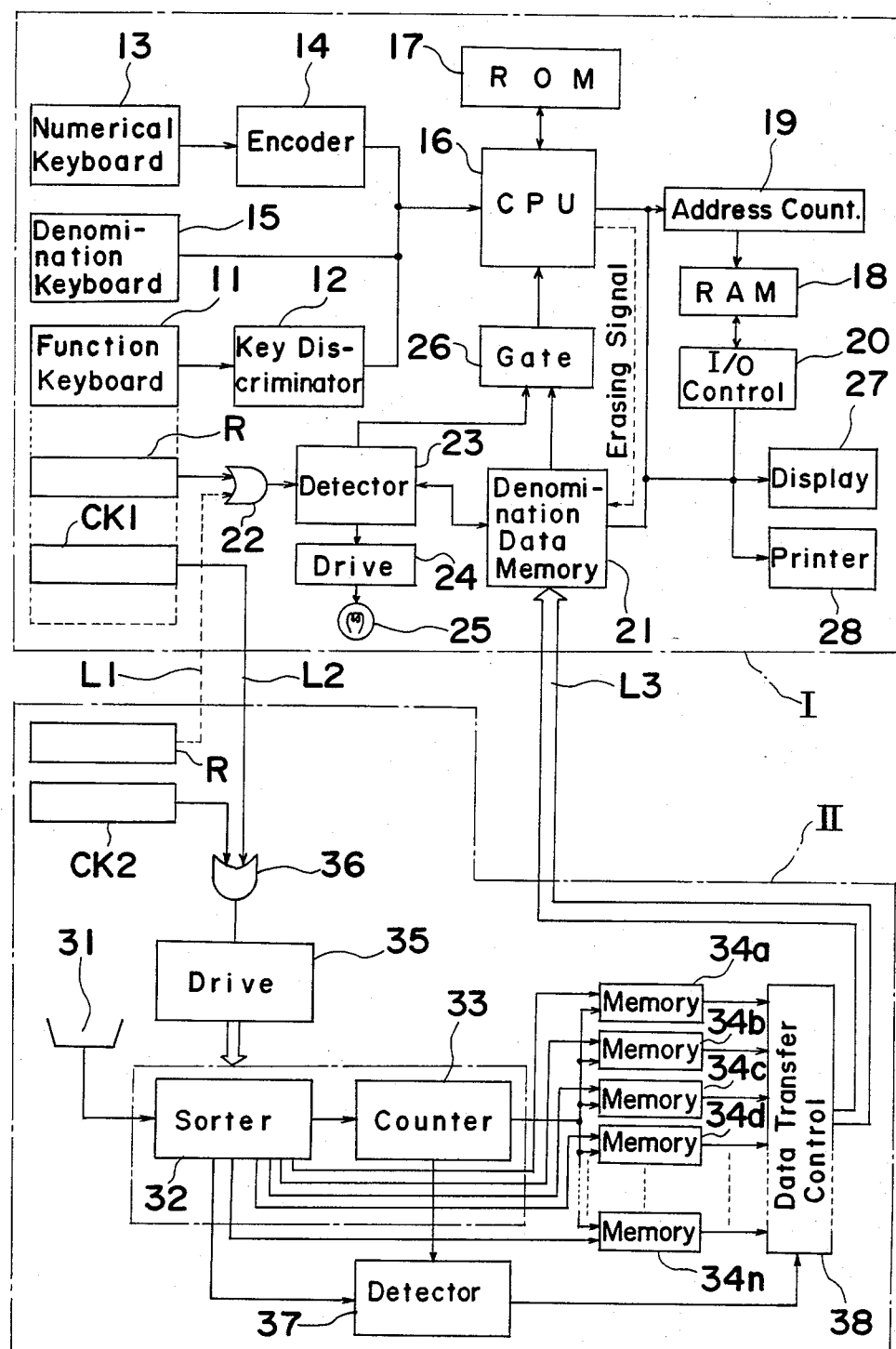
FIG. 3 is a schematic block diagram showing an accounting system according to a preferred embodiment of the present invention.

Referring now to FIG. 3, a cash accounting system shown therein comprises a cash register I and a counting machine II both electrically connected to each other through connection lines L1, L2 and L3. The cash register I comprises a function keyboard 11 having a plurality of function keys including a deposit key, item specifying keys, a read-in key R and a count start key CK1, a key discriminator 12 connected with the function keyboard 11, a numerical keyboard 13, a key encoder 14 for the numerical keyboard 13, and a denomination keyboard 15. The cash register I also comprises a central processing unit (hereinafter referred to as "CPU") 16, a read-only memory (hereinafter referred to as "ROM") for storing a program necessary to control the sequence of operation of the CPU, a random access memory (hereinafter referred to as "RAM") 18 for storing input data as well as results of calculations, and an address counter 19 for designating the address of the RAM 18 so that information can be transmitted between it and the RAM 18 through an input/output control unit 20.

The cash register I further comprises a denomination data memory unit 21 for temporarily storing count information of different denominations supplied from the counting machine through the connection line L3, a detector unit 23 adapted to receive a signal indicative of the manipulation of the read-in key R which is applied thereto through an OR gate 22 and operable to detect the presence or absence of the stored information in the data memory unit 21 in response to the signal fed from the OR gate 22, a drive circuit 24 having a lamp 25 and adapted to be operated to energize the lamp 25 in the event that the detector unit 23 has detected the absence of the information in the data memory unit 21, and a gating circuit 26 adapted to be triggered on to pass the contents of the data memory 21 onto the CPU 16 therethrough in the event that the detector unit 23 has detected the presence of the information in the data memory unit 21.

It is to be noted that the contents of the data memory unit 21 can be erased in readiness for the next succeeding operation in response to an output signal generated from the CPU 16 in association with the completion of registration of the transaction. It is also to be noted that reference numerals 27 and 28 represent a display unit for displaying various input information and the results of calculation and a printer unit for printing the various input information and the results of calculation on a recording medium such as a paper.

The counting machine II comprises a tray 31 for receiving money to be deposited, which money may include one or both of papers and coins, a sorter unit 32 for sorting the deposited money according to the denomination, a counter unit 33 for counting the money of different denominations, a plurality of memories 34a, 34b . . . 34n−1 and 34n for storing the respective subamounts of money of different denominations. The counting machine II also comprises a drive unit 35 operable in response to an output from an OR gate 36 to drive both of the sorter unit 32 and the counter unit 33, a detector unit 37 operable in response to an output signal from both of the sorter and counter units 32 and 33 for detecting the completion of the counting operation, and a data transfer control unit 38 operable in response to a detection output from the detector unit 37 to control the transfer of the data stored in the memories 34a, 34b . . . 34n−1 and 34n to the data memory 21 through the connection line L3. It is to be noted that the output from the OR gate 36 is indicative of the manipulation of either the count start key CK1 provided in the cash register I or a similar count start key CK2 provided in the cash counting machine II and, for this purpose, the gate 36 has one input terminal connected to the count start key CK1 through the connection line L2 and the other to the count start key CK2. A read-in key R identical with that included in the cash register I is also provided in the counting machine II and is connected to the OR gate 22 through the connection line L1.

Figure 4:
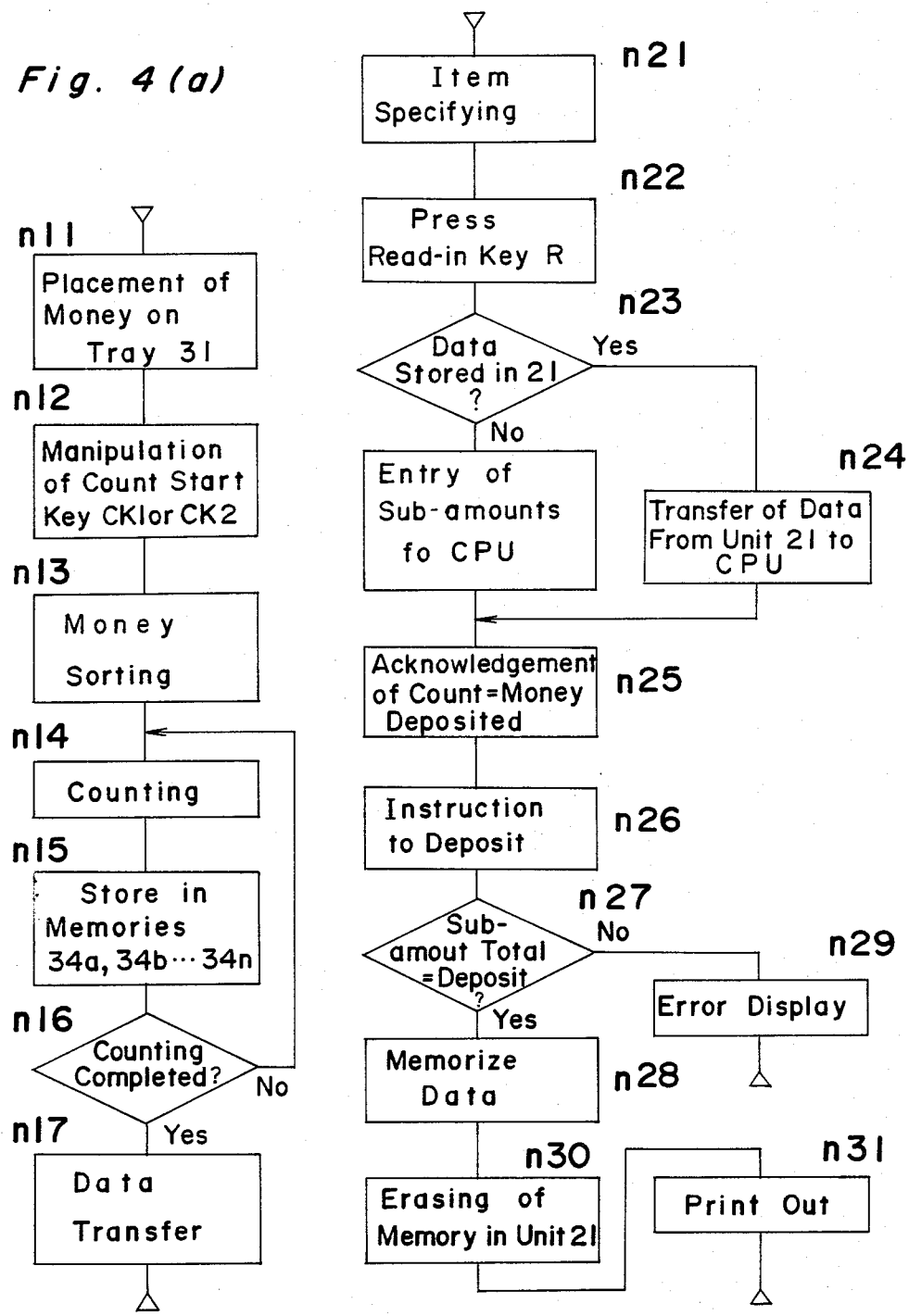
FIGS. 4(a) and 4(b) are flow charts showing the respective sequences of operation of the counting machine and the cash register both used in the accounting system shown in FIG. 3.

The operation of the system of the construction hereinabove described will now be described with particular reference to FIG. 4 wherein FIGS. 4(a) and 4(b) are flow charts illustrating the respective sequences of operation of the counting machine II and the cash register I.

Assuming that the customer has placed a certain amount of money on the tray 31 at the stage n11 and then pressed either one of the count start keys CK1 and CK2 at the subsequent stage n13, the output signal from the OR gate 36 is applied to the drive unit 35 to activate the latter thereby driving both of the sorter and counter units 32 and 33. When so driven, the sorter unit 32 serves, at the stage n13, to sort the amount of the money placed on the tray 31 according to the denomination to provide sub-amounts of different denominations and the counter unit 33 undergoes, at the stage n14, its counting operation subject to the sorted sub-amounts. The counts given by the counter unit 33 and corresponding to the sub-amounts of money of different denominations are then (at the stage n15) stored in the respective memories 34a, 34b . . . 34n−1 and 34n, thereby completing the counting operation. When the detector unit 37 detects the completion of the counting operation at the stage n16 and then generates and output signal indicative of the completion of the counting operation, the count data stored respectively in the memories 34a, 34b . . . 34n−1 and 34n are transferred to the data memory unit 21 in the cash register I through the data transfer control unit 38 at the stage n17 and then stored in the data memory 21.

On the other hand, in the cash register I, information concerning the item (i.e., either ordinary account or current account) of the transaction being then performed is supplied from the function keyboard 11 to the CPU 16 through the key discriminator 12 at the stage n21 and, when the read-in key R in the function keyboard 11 is subsequently (at the stage n22) depressed, the detector 23 is brought into operation to detect the presence or absence of the stored data in the memory unit 21 at the stage n23. When the detector 23 detects the presence of the data in the memory unit 21, the gating circuit 26 is triggered to allow the data, which has been stored in the memory unit 21, to be tranferred onto the CPU 16 at the stage n24. When the data are so transferred from the memory unit 21 to the CPU 16 through the gating circuit 26, the CPU 16 and the ROM 17 serve as an input handling means for handling the count data, which have been stored in the memory unit 21, as input signals indicative of the sub-amounts of money of different denominations. Thereafter, the operator manipulates the numerical keyboard 13 to supply information of the amount of money to be deposited to the CPU 16 through the key encoder 14 at the stage n25 and also manipulates the deposit key in the function keyboard 11 to supply through the key discriminator 12 to the CPU 16 at the stage n26 a signal predicting to the CPU 16 that the count information which has been transferred thereto is the amount of money to be deposited.

At the stage n27, the CPU 16 then starts to compare the data from the memory unit 21 with that from the keyboard arrangement to determine whether or not they are equal to each other. If they are equal to each other, the data is stored at a predetermined area of the RAM 18, designated by the address counter 19, under the control of the input/output control unit 20 at the stage n28. If they are not equal to each other, an error display is made on the display unit 27 the stage n29 to inform the operator to this effect.

The data stored in the predetermined area of the RAM 18 are also printed out by the printer unit 28 at the stage n31 in a conventional manner.

It is to be noted that, in the case where the datector 23 detects the absence of the data in the memory unit 21 at the time the read-in key R has been depressed, the drive circuit 24 is activated in response to the output from the detector 23 to energize the lamp 25 thereby informing the operator that the counting operation has not been performed. In this case, the operator noticing the lamp 25 energized causes the counting machine II to execute the counting operation or, alternatively, manipulates the keyboard arrangement of the cash register I to supply the count information.

It is to be noted that, when and after the deposit key has been depressed, the CPU 16 has confirmed that the total of the sub-amounts of different denomination is equal to the amount of money deposited and the data have subsequently stored in the RAM 18 thereby completing transaction registration, the CPU 16 generates an erasing signal to clear or erase the contents stored in the memory unit 21 in readiness for the next succeeding operation. This is shown as the stage n30 in FIGS. 4(b).

In the foregoing embodiment, the data memory unit 21 has been described as provided in the cash register I so that the count information given by the counting machine II can be automatically transferred to the data memory unit 21 upon completion of the counting operation performed by the counting machine II. However, the present invention need not be limited thereto, but may be so constructed and so designed that the count information given by the counting machine II can be transferred from the machine II to the cash register I to cause it to be read in the central processing unit in the cash register I in response to the manipulation of a count information read-in means (such as the read-in key R).

Figure 5:
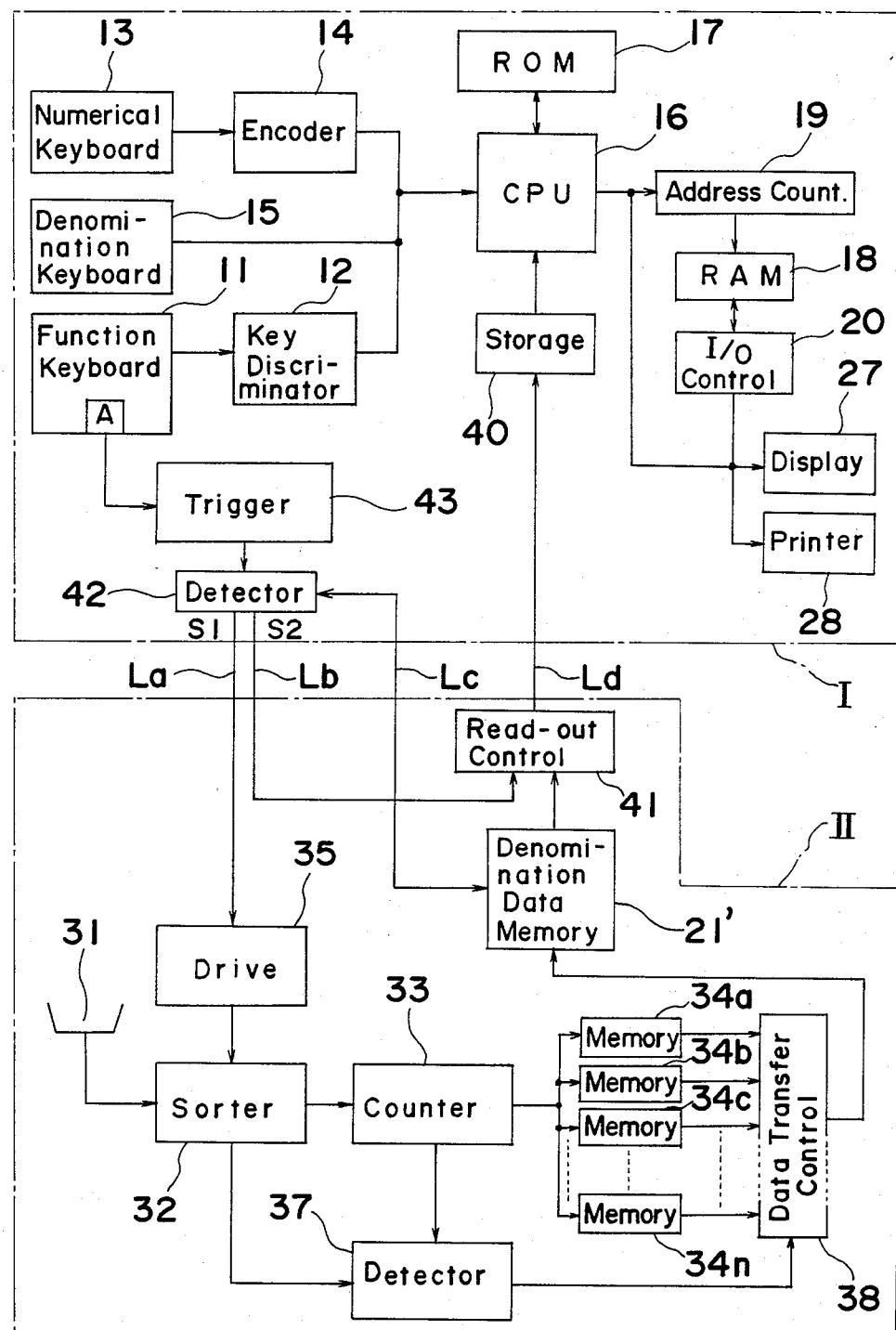
FIG. 5 is a diagram similar to FIG. 3, showing another preferred embodiment of the present invention.

In the embodiment shown in FIG. 5, the cash register I is electrically connected with the counting machine II through connection lines La, Lb, Lc and Ld. As most of the circuit construction shown in FIG. 5 is substantially identical with that shown in FIG. 3, only the difference will be described for the sake of brevity.

Referring to FIG. 5, the denomination data memory unit which has been described as provided in the cash register in the foregoing embodiment is, in the embodiment of FIG. 5, provided in the counting machine II as shown by 21'. This memory unit 21' is connected to a read-out control unit 41 which is in turn connected by means of the line Ld to the CPU 16 through a temporary denomination data storage 40 for temporarily storing the count data fed from the memory unit 21 through the read-out control unit 40. The read-out control unit 41 has one input terminal connected to the memory unit 21' and the other input terminal to one output terminal S2 of a detector 42 through the line Lb and is adapted to be triggered to pass the count data from the memory unit 21' to the storage 40 therethrough when an output signal indicating that the detector 42 has detected the presence of the count data in the memory unit 21' is applied thereto from the output terminal S2 of the detector 42. The output terminal S1 of the detector 41 is connected through the line La to the drive unit 35 in the counting machine II in the event that the detector 42 in the cash register has detected the absence of the count data in the memory unit 21'. It is to be noted that the count data stored in the memory unit 21' can be cleared or erased in readiness for the next succeeding operation in association with the generation of the output signal from the output terminal S2 of the detector 42.

The detector 42 is adapted to be driven by an output from a trigger circuit 43 which indicates that reference should be made to the count data stored in the memory unit 21'. The triggering circuit 43 is adapted to receive an input signal indicative of the manipulation of a special key A included in the function keyboard 11, which special key A corresponds to a combination of the read-in key R and the count start key CK1 both used in the foregoing embodiment.

Figure 6:
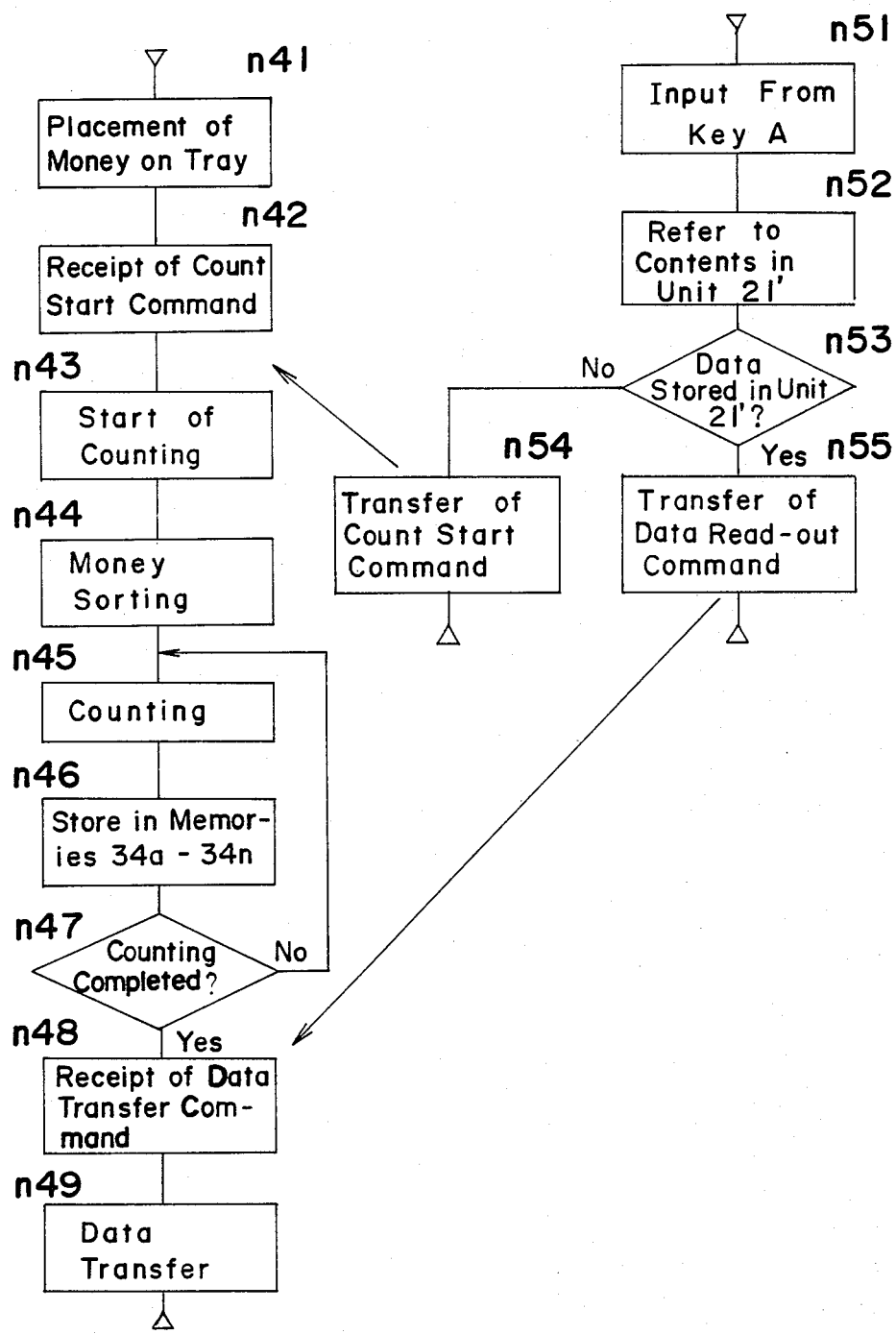
FIGS. 6(a) and 6(b) are flow charts showing the respective sequences of operation of the counting machine and the cash register used in the accounting system shown in FIG. 3.
Figure 6B:
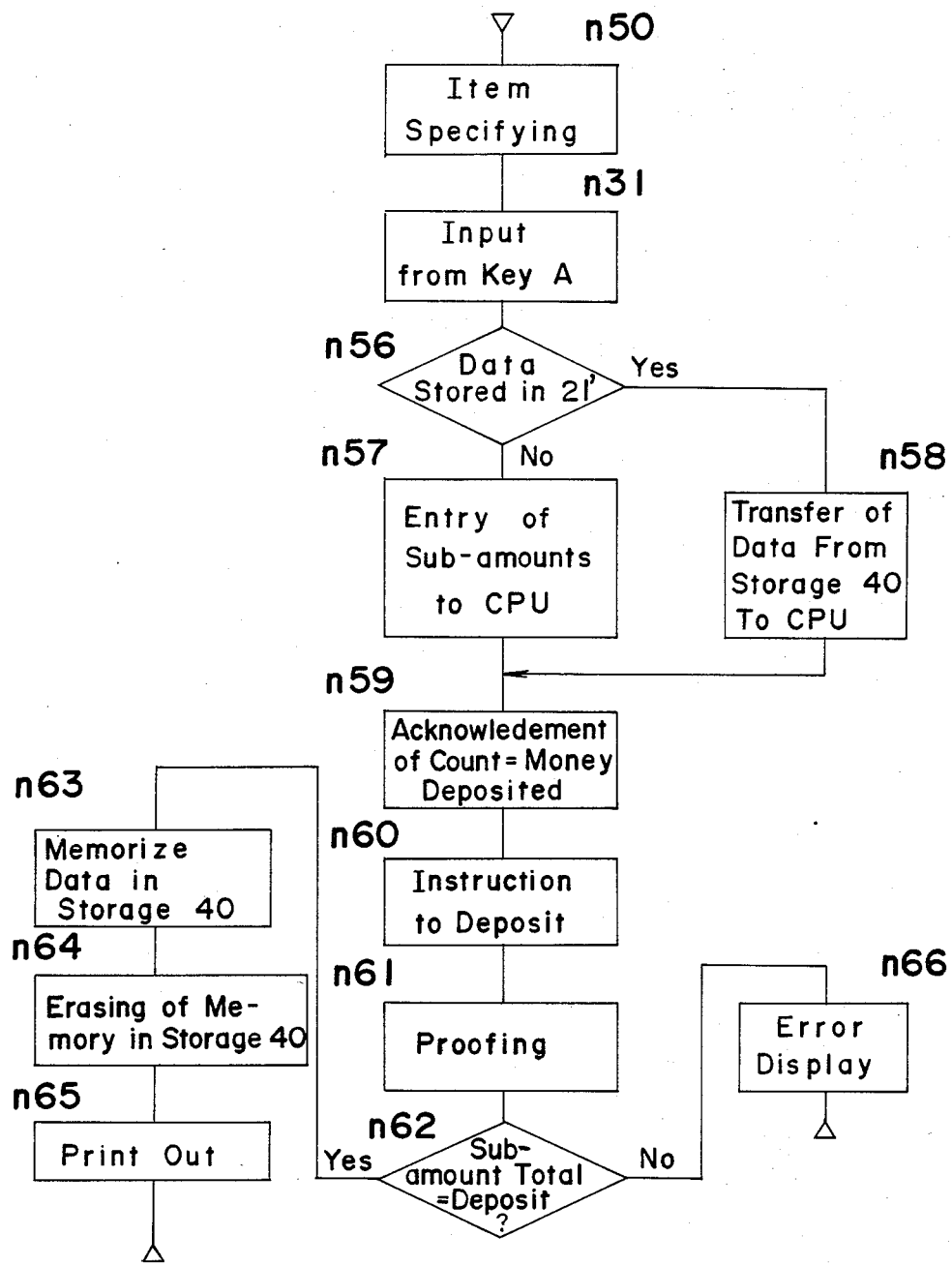

The operation of the system according to the embodiment shown in FIG. 5 will now be described with particular reference to FIG. 6 wherein FIGS. 6(a) and 6(b) illustrate the respective sequences of operation of the counting machine II and the cash register II.

Assuming that the customer has placed a certain amount of money on the tray 31 at the stage n41 and then pressed the special key A in the function keyboard 11 at the stage n51, the triggering circuit 43 is operated at the stage n52 causing the detector 42 to determine whether or not the count data have been stored in the memory unit 21' at the stage n53. In the event that the detector 42 has detected the absence of the count data in the memory unit 21', the output signal, i.e., the count start command, emerges from the output terminal S1 of the detector 42, which is in turn fed to the counting machine II through the line La at the stage n54, particularly to the drive unit 35.

When the drive unit 35 receives the count start command at the stage n42, the drive unit 35 is brought into operation at the stage n43, the sorter unit 32 serves, at the stage n44, to sort the amount of the money placed on the tray 31 according to the denomination to provide sub-amounts of different denominations and the counter unit 33 undergoes, at the stage n45, its counting operation subject to the sorted sub-amounts. The counts given by the counter unit 33 and corresponding to the sub-amounts of money of different denomination are then (at the stage n46) stored in the respective memories 34a, 34b . . . 34n−1 and 34n, thereby completing the counting operation. When the detector unit 37 detects the completion of the counting operation at the stage n47 and then generates an output signal indicative of the completion of the counting operation, the count data stored respectively in the memories 34a, 34b . . . 34n−1 and 34n are transferred to the data memory unit 21' in the cash register I through the data transfer control unit 38 at the stage n49 and then stored in the data memory 21'.

On the other hand, in the cash register I, information concering the item (i.e., either ordinary account or current account) of the transaction being then performed is supplied from the function keyboard 11 to the CPU 16 through the key discriminator 12 at the stage n50 and, when the special key A in the function keyboard 11 is subsequently (at the stage n51) depressed, the triggering circuit 43 is brought into operation at the stage n52 causing the detector to detect the the presence or absence of the stored data in the memory unit 21' at the stage n53. When the detector 42 detects the presence of the data in the memory unit 21', a data read-out command emerges from the output terminal S2 and is then (at the stage n55) fed to the counting machine II through the line Lb, particularly to the data read-out control unit 41.

When the data read-out control unit 41 has received the data read-out command at the stage n48, the data read-out control unit 41 is driven to allow the data which have been stored in the memory unit 21', to be transferred, at the stage n49, to the cash register I through the line Ld and stored in the storage 40. After the transfer of the data from the memory unit 21' to the storage 40 through the read-out control unit 41, the memory unit 21' is erased or cleared.

When the data are so stored in the storage 40 are transferred to the CPU 16 at the stage n58, the CPU 16 and the ROM 17 serves as an input handling means for handling the count data, which have been stored in the storage 40, as input signals indicative of the sub-amounts of moeny of different denominations. Thereafter, the operator manipulates the numerical keyboard 13 to supply information of the amount of money to be deposited to the CPU 16 through the key encoder 14 at the stage n59 and also manipulates the deposit key in the function keyboard 11 to supply through the key discriminator 12 to the CPU 16 at the stage n60 a signal predicting the CPU 16 that the count information which has been transferred thereto in the amount of money to be deposited.

Then, the CPU 16 starts, at the stages 61 and 62, a proofing operation to compare the data from the storage 40 with that from the keyboard arrangement to determine whether or not they are equal to each other. If they are equal to each other, the data is stored at a predetermined area of the RAM 18, designated by the address counter 19, under the control of the input/output control unit 20 at the stage n63. If they are not equal to each other, error display is made on the display unit 28 at the stage n66 to inform the operator to this effect.

Upon completion of a series of the sequence in which the total of the sub-amounts of different denominations has been confirmed as equal to the amount of the deposited money by the CPU 16 and the data has been subsequently stored in the RAM 18, the CPU 16 clears or erases the contents of the storage 40 in readiness for the next succeeding operation at the stage n64.

From the foregoing, it has now become clear that the system according to the present invention is such that, upon completion of the counting of the money deposited, the data of the counted amount can automatically be transferred from the counting machine to the cash register. This arrangement substantially eliminates the necessity of the operator manipulating the money to count. This in turn results in substantial elimination of any possible error which would result from the manual intervention and also in speeding up the transaction of money to be deposited.

Although the present invention has fully been described in connection with the preferred embodiments thereof with reference to the accompanying drawings, it is to be noted that various changes and modification are apparent to those skilled in the art. Such changes and modifications are to be understood as included within the scope of this invention unless they depart therefrom.

I claim:

1. A cash accounting system comprising:

cash counting means for sorting each piece of money including bills introduced therein and for counting the amount of each denomination of said money, said cash counting means including, means for sorting said introduced money into separate denominations, means, responsive to said means for sorting, for counting the number of pieces of each denomination of money introduced and producing an output representative thereof, means, responsive to the output of said means for counting, for storing the count data representative of the number of pieces of each denomination of money, and means, responsive to said means for sorting and means for counting, for detecting the sorting and counting of the last piece of money introduced into said cash counting means and producing a count completion signal in response thereto;

cash register means for registering transaction data, said cash register means including, keyboard input means for introducing data and function commands, processor means, responsive to said keyboard input means, for manipulating said introduced data to form completed transaction data, and memory means for storing said transaction data developed by said processor means;

data count read means for reading said count data stored in said means for storing of said cash counting means and for providing said count data to said processor means of said cash register means.

2. A system as claimed in claim 1, wherein said data count read means is provided in said cash counting machine.

3. A system as claimed in claim 1, wherein said cash register means includes an input handling means for handling said count data as inputs indicative of amounts of the money in each different denomination.

4. A system as claimed in claim 3, wherein said input handling means includes means for determining the presence or absence of said count data.

5. A system as claimed in claim 3, wherein said input handling means has a capability of erasing the stored count data in response to said count completion signal.

6. A system as claimed in claim 1, further comprising a special key input means provided in the cash register means, and means operable in response to the manipulation of said special key input means and part of said cash register means for detecting the presence or absence of the count data in the memory means, said memory means generating a read-out signal for reading out the count data stored in said memory means or a count start signal to enable said cash counting means depending on the result of the detection performed by said detecting means.

7. The system of claim 1 wherein said data count read means provides said count data to said processor means only when a count completion signal is developed by said means for detecting.

8. The system of claim 1 further comprising intermediate money data memory means, operatively interposed between said processor means and means for storing, for temporarily storing said count data therein.

9. The system of claim 8, wherein said intermediate money data memory means is provided in said cash register.

* * * * *